Nov. 27, 1956 G. KAJCSA 2,772,040
TROUSERS HANGER
Filed Feb. 1, 1955
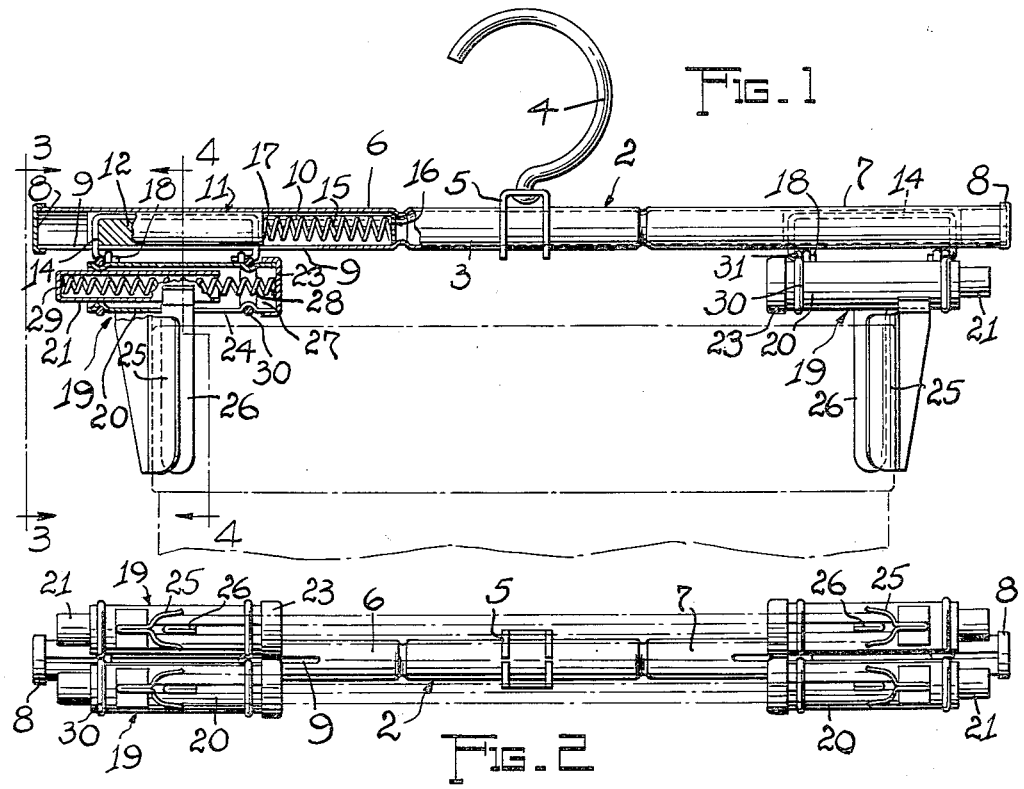
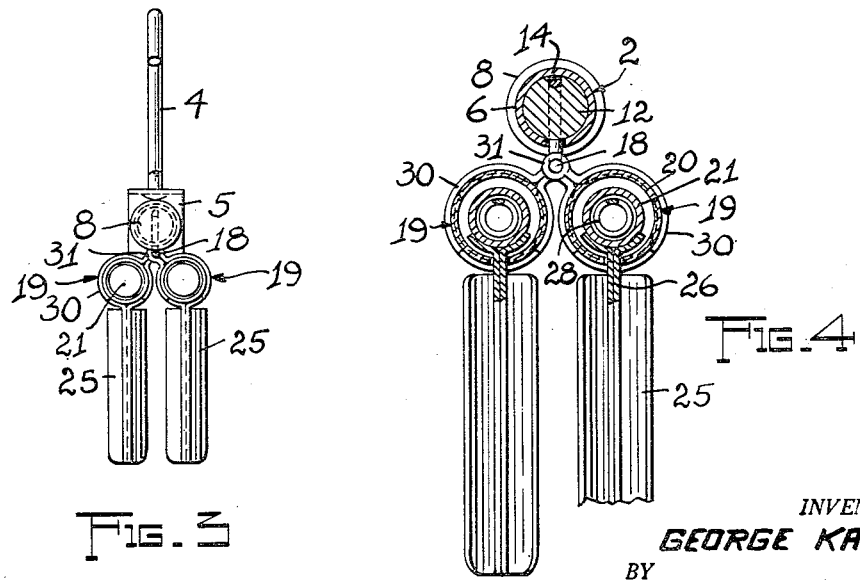
INVENTOR.
GEORGE KAJCSA
BY
ATT.

United States Patent Office 2,772,040
Patented Nov. 27, 1956

2,772,040

TROUSERS HANGER

George Kajcsa, Cleveland, Ohio

Application February 1, 1955, Serial No. 485,407

4 Claims. (Cl. 223—96)

This invention relates in general to hangers for suspending men's trousers and more particularly to hangers of the type which support men's trousers in inverted depending position by spreading devices extended into the bottom ends of the legs of the trousers, each of the spreading devices including a pair of shiftable arm portions yieldingly shifted in a direction away from each other into contact with the insides of the legs of the trousers at diametrically opposed areas thereof. Support of men's trousers by the spreading devices of this type of hangers necessitates application of substantial force to properly hold the trousers by the arm portions of the spreading devices, a force which tends to stretch the lower leg portions of the trousers and causes wrinkling of the legs and body of the trousers.

It is the general object of the present invention to provide an improved men's trousers hanger of the type referred to above which embodies spreading devices including two pairs of individual, shiftable gripping devices arranged in opposed shiftable relation with respect to each other, the gripping devices being adapted to individually grip opposed areas of the end portion of a leg of a pair of trousers so that the gripping devices may be shifted away from each other with little force for proper suspension of the trousers without excessive stretching of their leg portions.

Another object of the invention is the provision of an improved men's trousers hanger as described above having the shiftable individual gripping devices constructed to include cooperating spring-pressed clamping jaws arranged in opposed relation with respect to each other to grip the leg portions of a pair of trousers by direct yielding contact with opposed inside and outside areas of such leg portions.

A further object of the invention is the provision of an improved men's trousers hanger as described above having the cooperating spring-pressed clamping jaws of shiftable individual gripping devices constructed to form male and female members shaped to engage, grip and reform creased areas of the lower leg portions of a pair of trousers.

With the above and other objects in view, the invention has certain other marked superiorities which clearly distinguish it from presently known structures and arrangements of this type. These improvements or characteristics, embodying certain novel features of construction and design, are clearly set forth in the appended claims, and a preferred form of embodiment of the invention is hereinafter shown with reference to the accompanying drawing forming part of the specification.

In the drawing:

Fig. 1 is a side view, partly in section, of a men's trousers hanger constructed in accordance with the invention;

Fig. 2 is a bottom view of Fig. 1;

Fig. 3 is an end view of Fig. 1 seen from line 3—3 of said figure; and

Fig. 4 is a cross sectional view taken on line 4—4 of Fig. 1.

In the exemplified form of the invention shown in the drawing, reference numeral 2 denotes an elongated tube, the central portion 3 of which mounts a wire hook 4 attached thereto by a bracket 5. Tube 2 includes two cylindrical end portions 6 and 7 closed at their ends by caps 8, each of which end portions embodies an elongated longitudinal slot 9 in its bottom face and supports in the respective tubular chamber 10 of such tubular end portion a supporting element 11, the base portion 12 of which is shiftably mounted in tubular chamber 10 and the supporting portion 14 of which is extended outside of said chamber through slot 9.

Each supporting element 11 is yieldingly forced toward the respective cap 8 by a compression spring 15 which is arranged in a chamber 10 between a circular abutment 16 in tube 2 and the inner end 17 of the respective base portion 12.

Each supporting portion 14 includes opposed horizontally arranged pin-like extensions 18 which hingedly support a pair of clamping devices 19 adapted to tightly grip the lower edges of the legs of a pair of trousers to hold same in an inverted position.

These clamping devices each embody two telescoped tubular members, to wit: an outer member 20 and an inner tubular member 21. The outer tubular member 20, which is closed at its end 22 by a cap 23, is slotted at 24 for a purpose later to be described and has radially extended therefrom an open-channeled clamping member 25, and the inner tubular member 21 is telescoped into outer tubular member 20 and has radially extended therefrom a knife-like clamping member 26 which is extended through slot 24 into the outer tubular member opposite the open-channeled clamping member 25. The telescoped tubular members 20 and 21 form a spring retainer 27 for a compression spring 28 which is seated between cap 23 of outer tubular member 20 and end wall 29 of inner tubular member 21 and yieldingly forces the inner tubular member 21 out of the outer tubular member 20 so that the knife-like clamping member 26 is yieldingly shifted toward open-channeled clamping member 25 and effects proper gripping of the legs of a pair of trousers.

Clamping devices 19 are hinged to pin-like elements 18 of supporting elements 11 by spring-clips 30, the loop-shaped eyelets 31 of which are sleeved upon said extensions.

In the operation of the hanger, each leg of a pair of trousers is clamped at diametrically opposed areas of the crease of such leg by two clamping devices 19. Clamping is successively effected in these areas by axially compressing the respective spring retainer 27 to shift the respective knife-like clamping member 26 out of contact with the respective open-channeled clamping member 25, inserting the respective creased areas at the end of the trousers' leg between the two cooperating clamping members 25 and 26, with knife-like clamping member 26 positioned within the trousers' leg, and releasing the spring retainer to permit proper gripping by clamping devices 19. These latter devices are shifted in a direction away from each other by the relatively soft compression springs 28 to straighten the legs of the trousers in their suspended position without excessive stretching and wrinkling of their leg and body portions.

Having thus described my invention,

What I claim is:

1. A trousers hanger with pairs of aligned trousers leg gripping devices hingedly and yieldingly slidably suspended from an elongated body, said gripping devices each including a pair of axially aligned shiftable clamping members and compression spring means yieldingly forcing said clamping members toward each other to automatically effect gripping and reshaping of creased areas of a pair of trousers suspended from said trousers hanger.

2. A trousers hanger as described in claim 1, wherein one of the clamping members of each gripping device embodies a male jaw member adapted to be extended into a trousers leg in alignment with a crease therein, and wherein the other one of said clamping members embodies a female jaw member aligned with said male jaw member opposite thereto to engage the outside of the trousers leg at the crease engaged by the male jaw member.

3. A trousers hanger as described in claim 1, wherein the two clamping members of each gripping device include two telescoped, slidably interlocked tubular members having said compression spring means arranged therein and the clamping members attached thereto to effect by the compression spring means shifting of the clamping members toward each other.

4. A hanger as described in claim 3, wherein the clamping jaw of the male clamping jaw member includes a knife-like clamping edge, and wherein the clamping jaw of the female clamping jaw member includes a channeled clamping edge arranged opposite to and aligned with the knife-like clamping edge of the male clamping jaw.

References Cited in the file of this patent
UNITED STATES PATENTS

| | | |
|---|---|---|
| 695,924 | Grotenhuis | Mar. 25, 1902 |
| 2,017,761 | Leonard | Oct. 15, 1935 |